United States Patent [19]

Pearlman et al.

[11] Patent Number: 5,470,648
[45] Date of Patent: Nov. 28, 1995

[54] COMPOSITE FABRICS OF NONWOVEN NYLON LAYERS AND FIBERGLASS SCRIM

[75] Inventors: Paul S. Pearlman, Thornton, Pa.; Vijayendra Kumar, New Castle, Del.

[73] Assignee: E. I. Du Pont de Nemours and Company, Wilmington, Del.

[21] Appl. No.: 258,120

[22] Filed: Jun. 10, 1994

[51] Int. Cl.⁶ ............................................. B32B 5/12
[52] U.S. Cl. ................... 428/247; 428/225; 428/224; 428/229; 428/246; 428/296
[58] Field of Search ........................... 428/224, 225, 428/229, 246, 247, 284, 296

[56] References Cited

U.S. PATENT DOCUMENTS

| | | | |
|---|---|---|---|
| 3,214,819 | 11/1965 | Guerin | 28/72.2 |
| 3,485,706 | 12/1969 | Evans | 161/72 |
| 3,493,462 | 2/1970 | Bunting, Jr. et al. | 161/169 |
| 3,728,195 | 4/1973 | Bolles | 156/441 |
| 4,030,168 | 6/1977 | Cole | 28/101 |
| 4,491,617 | 1/1985 | O'Connor et al. | 428/236 |
| 4,504,539 | 3/1985 | Petracek et al. | 428/195 |
| 4,762,744 | 8/1988 | Wolcoshyn et al. | 428/219 |
| 5,187,005 | 2/1993 | Stahle et al. | 428/252 |

FOREIGN PATENT DOCUMENTS 707930  11/1979  South Africa.

Primary Examiner—Patrick J. Ryan
Assistant Examiner—Richard P. Weisberger

[57] ABSTRACT

This invention relates to composite fabrics having two layers of nonwoven fabric comprising entangled non-bonded nylon filaments and a reinforcing layer of fiberglass scrim adhesively attached to each of the nonwoven layers. The composite fabrics are useful as backings in a carpet assembly.

7 Claims, No Drawings

COMPOSITE FABRICS OF NONWOVEN NYLON LAYERS AND FIBERGLASS SCRIM

FIELD OF THE INVENTION

This invention relates to composite fabrics having two layers of nonwoven fabric comprising entangled, non-bonded nylon filaments and a reinforcing layer of glass fiber scrim.

BACKGROUND OF THE INVENTION

Nonwoven fabrics composed of nylon fibers may be used for manufacturing such products as hospital gowns, wiping cloths, and home furnishings such as sheets, table cloths, carpets, and rugs. However, in some environments where there are seasonal changes in the humidity and temperature, these fabrics are liable to become distorted due to shrinkage and expansion of the fabric. In the case of rugs or carpets that are loosely laid and then held to the floor at spaced locations by heavy furniture or the like, seasonal weather changes may produce such distortions that result in buckling of the carpet surface between stationary portions of the carpet. This carpet buckling is unsightly and presents a tripping hazard. In view of the foregoing, there is a need for a nylon nonwoven fabric which would demonstrate good strength and moisture stability under common environmental conditions.

The present invention provides a composite fabric comprising two layers of a nylon nonwoven fabric and a reinforcing layer of fiberglass scrim. This composite fabric is lightweight, strong, and flexible, and demonstrates good moisture stability.

In one application, the composite fabric of this invention may be used as a moisture-stable carpet backing for a carpet made from nylon tufts bonded to a reinforced nylon strand. Such a carpet is described in co-pending U.S. patent application Ser. No. 08/017,162, filed Feb. 22, 1993, the disclosure of which is hereby incorporated by reference. A carpet having a backing composed of the composite fabric of this invention would offer other advantages in addition to being moisture-stable. For instance, such a carpet could easily be recycled, since it would consist only of nylon and nylon-melt compatible components. In conventional carpets, many different components, such as nylon, latex and polypropylene, must first be separated with great difficulty before the nylon carpet tufts can be depolymerized.

SUMMARY OF THE INVENTION

This invention provides a composite fabric comprising a first layer of a nonwoven fabric comprising entangled, non-bonded nylon filaments. Preferably, the weight of said fabric is in the range of about 0.75 to about 6.00 ounces per square yard. The second layer is a fiberglass scrim comprising an array of intersecting continuous multifilament glass strands. The third layer is a nonwoven fabric comprising entangled, non-bonded nylon filaments. Preferably, the weight of this fabric is also in the range of about 0.75 to 6.00 ounces per square yard. The first layer of nonwoven fabric is adhesively attached to the layer of fiber glass scrim at the contact surface of said fabric and scrim. The second layer of nonwoven fabric is adhesively attached to the fiberglass scrim at the contact surface of said fabric and scrim.

Preferably, the fiberglass scrim is composed of an intersecting array of at least 6 multifilament strands by 6 multifilament strands per inch of scrim, wherein each strand has a denier of at least 500 and a tensile break strength of at least 8 pounds. The scrim may also include multifilament fiberglass strands crossing over the intersecting array of multifilament strands in a diagonal.

Preferably, the nylon filaments of the nonwoven layer of fabric are hydro-entangled or needle-punched, and these filaments may be continuous filaments or staple fiber.

DETAILED DESCRIPTION OF THE INVENTION

This invention relates to a composite fabric comprising a first layer of a nonwoven nylon fabric, a reinforcing layer of fiberglass scrim, and another layer of nonwoven nylon fabric. The nonwoven nylon fabric is composed of entangled nylon filaments which are not fused or bonded to each other.

The fiberglass scrim is an open network structure made of continuous, multifilament, fiberglass yarn strands. This open network may or may not be woven. The scrim may be manufactured by techniques known in the trade, such as those described in U.S. Pat. Nos. 3,728,195, 4,030,168, and 4,762,744, the disclosures of which are hereby incorporated by reference. Preferably, the fiberglass scrim contains at least 6 multifilament strands per inch evenly spaced in the "machine direction" (MD) and at least 6 multifilament strands evenly spaced in the "cross direction" (XD). By the term, "machine direction", it is meant the length direction of the fabric, i.e., the direction in which the scrim is being produced by the machine. By the term, "cross direction" it is meant the width direction of the fabric, i.e., perpendicular to the direction in which the fabric is being produced by the machine. It is important that the strands be evenly spaced so there is not an excessive length of strand between crossing support strands, because this length may be more likely to buckle when a compressive force is applied. An array having a free span of strand no greater than ¼ inch is preferred when using conventional scrims. If heavier strands are used in the scrim, then the free span can be greater than ¼ inch.

Preferably, there are at least 6 strands per inch by 6 strands per inch of multifilament yarns making up the scrim array, and the scrim has a tensile break strength in both the MD and XD of 45 lbs/inch. The preferred weight of the strands in the fiberglass scrim is at least 500 denier, and each strand in the MD and XD direction has a break strength of about 8 pounds. The following table illustrates the tensile break strength properties of different fiberglass scrims having an intersecting array of 6 strands in the MD and 6 strands in the XD.

| Denier | Strands Per Inch | Break Strength Per Strand | Break Strength Per Inch |
| --- | --- | --- | --- |
| 2000 | 6 × 6 | 32 lbs. | 192 lbs./inch |
| 1000 | 6 × 6 | 16 lbs. | 96 lbs./inch |
| 500 | 6 × 6 | 8 lbs. | 48 lbs./inch |
| 250 | 6 × 6 | 4 lbs. | 24 lbs./inch |

If the composite fabric is intended for use as a backing fabric in the above-mentioned tuftstring carpet assembly, then the intersecting array is preferably 8 strands in the MD ×8 strands in the XD, and the XD strands are preferably 2000 denier with a break strength of about 32 lbs. This is necessary, because the backing fabric is not strengthened by the elongated pile articles (tuftstrings) that run in the MD. The yarns in the MD may have the same or different denier and break strength than the XD strands. The use of such a strong backing fabric will result in a tuftstring carpet structure that exceeds the federal requirement of a 100 lb. standardized grab strength (4" wide sample clamped by a 1" wide clamp) in the MD and XD. The tuftstring contributes substantial strength to the assembled carpet in the MD, but at the same time, the tuftstring may weaken the strength of the scrim in the XD if ultrasonic bonding is used. This can be compensated for by adjusting the relative amount of fiberglass in the MD and XD of the composite fabric backing.

The fiberglass in the scrim is effective, because of its good tensile strength, thermal dimensional stability and moisture dimensional stability. In the laminate, composite fabric of this invention, the fiberglass easily overcomes expansion forces in the nonwoven, unbonded nylon fabric. When the specified scrim weight is used, it has also been found to be stiff enough to overcome the weak shrinkage forces in the specified nonwoven, unbonded nylon fabric.

With the scrim only containing yarns in the XD and MD directions, the composite fabric may not have enough diagonal stability for some applications. The structure can be made stable in the diagonal directions by adding fiberglass strands to the scrim in the diagonal directions. If the composite fabric is used as a tuftstring carpet backing, the diagonal strength requirements are less than the XD and MD requirements, so a lower denier strand could be used for the diagonal strands than for the XD and MD strands.

Each of the nonwoven nylon fabrics may be made by a conventional hydro-entanglement process as described in U.S. Pat. No. 3,485,706, the disclosure of which is hereby incorporated by reference, or by a conventional needle-punching process. The preferred weight of each nonwoven nylon fabric is 1 to 2 oz./sq. yd., although up to 4 oz./sq. yd. may be useful for some applications. Preferably, the hydro-entanglement process is used to manufacture the fabrics, since it is possible to make a much lower weight fabric having good uniformity with this process. Generally, the lowest weight conventional needle-punched layer possible is about 3.5 to 4 oz./sq. yd., and this process is more expensive than hydro-entanglement. In this invention, the weight of the nonwoven nylon fabric only needs to be 1 to 2 oz./sq. yd. in order to produce a useful lightweight, composite structure. Such a composite structure is especially useful as a backing in a tuftstring carpet assembly.

The nonwoven nylon layers are attached to the fiberglass scrim by an adhesive applied to the surface of the scrim. The first layer of nonwoven fabric is adhesively attached to the layer of fiber glass scrim at the surface where the fabric and scrim are in contact. The second layer of nonwoven fabric is adhesively attached to the layer of fiber glass scrim at the surface where this fabric and scrim are in contact. The scrim is coated with a thermoplastic adhesive which is compatible with the fiberglass strands and the nylon nonwoven fabrics. Suitable adhesives include, for example, modified acrylic resins such as a methyl methacrylate and ethyl acrylate cross-linked composition, styrene-butadiene (SBR) latex, polyvinyl chlorides, polyurethanes, and polyolefins. Hot melt adhesives may also be used. The scrim may be coated with the adhesive in any suitable manner such as spraying, dipping, or kiss-roll coating. The adhesive may also be applied in the form of a preferred web of thermoplastic adhesive, such as a 0.6 oz./sq. yd. fusible web of polyester and polyolefin, available as "Sharenet", from Applied Extrusion Technology of Wilmington, Del. The adhesive web may be in addition to applying adhesive to the scrim and may be placed between one of the layers of nonwoven and the scrim. The second layer of nonwoven may be joined to the scrim and adhesively joined to the adhesive web and the first nonwoven layer where the contact is made between the strands of the scrim. The adhesive of the web remains on the surface where it contacts the nonwoven layers and does not penetrate to the opposite surfaces of the nonwoven layers.

The adhesive process is preferred since it is cost effective and works with very low weight nonwoven layers. When a hydro-entanglement attachment process is used with low weight nonwoven fabric layers, an open structure results where the jets displace all the filaments at the openings in the scrim. This results in poor or no bonding between the the scrim and nonwoven nylon fabric when the backing is attached to another substrate, such as a tuftstring, which crosses the open area. Although using a heavier denier layer of nonwoven fabric may eliminate openings in the layer, the hydroentanglement attachment process also does not firmly attach the scrim to the nonwoven layers so the scrim is less effective in resisting expansion and shrinkage of the nonwoven layers.

It is important that the nonwoven nylon layers comprising the composite fabric have an unbonded structure, such as a hydro-entangled structure, at least between the scrim strands, so the individual nylon filaments comprising the nylon layers can be mobile in the composite fabric. The nylon filaments at the surface of the fabric layer contacting the scrim may be bonded together due to the adhesive on the strands of the scrim. However, in order to avoid bonding of the nylon filaments between the scrim strands, the adhesive should not extend substantially beyond the width of the strands in the scrim.

It has been discovered that a spunbonded, nonwoven nylon fabric, such as "Cerex" made by FiberWeb North America, Inc. of Simpsonville, S.C. may be used to produce a strong lightweight composite "Cerex"/Fiberglass/"Cerex" material, but not a stable structure that remains flat when subjected to repeated wettings and dryings. Rather, after repeated wettings and dryings, the spunbonded nylon shrinks to area dimensions less than the dimensions it had before it was bonded to the fiberglass scrim. Since the spunbonded nylon shrinks and the fiberglass does not, and the fiberglass scrim has limited ability to resist these shrinkage forces, the "Cerex"/Fiberglass/"Cerex" composite buckles, puckers, and wrinkles. It is believed that since the nonwoven nylon fabric is bonded, the individual filaments are fixedly connected at every intersection and the filaments are predominantly short and straight between intersections. Therefore, shrinkage of individual filaments causes shrinkage of the entire nonwoven nylon fabric, and substantial shrinkage forces are developed that cannot be overcome by the buckling stiffness of the glass fiber strands.

In the case of the composite fabric of this invention, the unbonded, nonwoven, nylon filaments also undergo shrinkage with repeated wetting and drying, but without a detrimental effect on the composite structure. It is believed that since individual filaments are not fixedly connected to adjacent filaments, and there are relatively long loopy lengths of filaments between entanglement points, the filaments are individually moveable without transmitting a substantial force to adjacent filaments. Thus, the filaments do not act together to cause shrinkage of the nonwoven fabric. No substantial shrinkage forces are developed that overcome the buckling stiffness of the glass fiber strands, so the composite fabric of the invention remains dimensionally stable with changes in moisture and temperature. To insure the loopy lengths of filaments are present in the fabrics during assembly with the scrim, it is important that the fabric not be put under a tension that may cause straightening of the filaments during assembly. Preferably, a very low tension is exerted on the fabric at assembly with the scrim. This will decrease the amount of shrinkage in the assembled composite product.

The nonbonded, nonwoven nylon fabric also acts as a supportive carrier and protective surface for the fiberglass scrim whose small denier multifilaments may be damaged by direct contact in rough handling. The nonbonded, nonwoven nylon fabric does not propagate substantial forces on the final assembly due to moisture or thermal influences that tend to change the geometry of nylon filaments in the fabric. This is especially so when the preferred low weight, nonbonded, nonwoven nylon fabrics of this invention are used. One preferred low weight, nonbonded, nonwoven fabric that has been found to be particularly effective is a hydroentangled fabric made by the DuPont Co. of Wilmington, Del. under the registered trademark "Sontara", where the filaments used are made of nylon 6 or nylon 6,6, or copolymers thereof. Such a fabric may or may not be isotropic as this is not critical in this invention and may be compensated for with the choice of fiberglass scrim used.

The invention is further illustrated by the following examples, but these examples should not be construed as limiting the scope of the invention.

TEST METHODS

Moisture Stability

A test was run with five different 40 cm ×40 cm samples to measure the expansion and shrinkage as the samples were exposed to changing conditions of temperature and humidity. The test involved evaluating the moisture of the samples at 10% RH and 100% RH at an elevated temperature of 40° C. to speed up the gain and loss of moisture in the samples. Each sample had measurement marks placed in the MD and XD about 30–35 cm long, and initial measurements were made with the sample at ambient temperature and humidity of about 27° C. and 45% RH. It was also discovered that the effects of moisture on a sample may be different after the sample has been through one complete wet and dry cycle, so in most cases the test results include two cycles of wet and dry. For the wet cycle, the sample was submerged in a shallow pan of slowly circulating water heated to 40° C. and left for at least 24 hours. The sample was then removed from the water and quickly measured while wet. For the dry cycle, the wet sample was placed on a wire rack in an oven heated to 40 deg° C. and left for at least 24 hours. The sample was then removed from the oven and quickly measured while dry. For more cycles, the dry sample was submerged in the water again and the process repeated. Several samples may have been placed in the water or oven at the same time.

EXAMPLES

The following samples were made by two different laminating methods. In some cases, the nylon nonwoven fabrics and scrim were processed in three (3) to six (6) feet wide webs and led to a hot nip where pressure was applied. In other cases, discrete sheets of nylon nonwoven fabrics and scrim were placed together in a hot press and laminated together. An amount of adhesive was used to attach the surface filaments of the fabrics to the scrim without passing through the fabrics to the side opposite the scrim. The modified acrylic resin used in the following samples was a cross-linked methyl methacrylate and ethyl acrylate composition. The moisture stability of the samples was then measured in accordance with the above Test Methods, and the results are reported in Table 2. The numbers in Table 2 are the percentage change in dimension relative to the sample dimensions at ambient conditions.

Sample 1: one 1 oz/sq yd nylon "Sontara" fabric with no scrim.

Sample 2: 1 oz/sq yd nylon "Sontara" fabric; laminated to a 500 denier XD ×1000 denier MD fiberglass scrim, 6×6 strands to the inch, SBR latex (styrene butadiene resin) adhesive applied to the scrim; laminated to a 1 oz/sq yd nylon "Sontara" fabric.

Sample 3: 1 oz/sq yd nylon "Sontara" fabric; laminated to a 500 denier XD ×1000 denier MD fiberglass scrim, 6×6 strands to the inch, "Rhoplex" water based acrylic resin adhesive, available from Rohm and Hass Co., applied to the scrim by spraying; laminated to a 1 oz/sq yd nylon "Sontara" fabric; all layers laminated together in a hot press at 170° C. under 5 psi.

Sample 4: 1 oz/sq yd nylon "Sontara" fabric; laminated to a 1000 denier XD ×1000 denier MD fiberglass scrim, 8×8 strands to the inch, modified acrylic resin adhesive applied to the scrim; laminated to a 1 oz/sq yd nylon "Sontara" fabric.

Sample 5: 1 oz/sq yd nylon "Sontara" fabric; laminated to a 500 denier XD ×1000 denier MD fiberglass scrim, 6×6 strands to the inch, "Sharenet" resin adhesive mat, available from Applied Extrusion Technology of Wilmington, Del., placed between the first mat and the scrim; laminated to a 1 oz/sq yd nylon "Sontara" fabric; all layers laminated together in a hot press at 170° C. under 5 psi.

Sample 6: one 1 oz/sq yd "Cerex" fabric with no scrim.

Sample 7: 1 oz/sq yd "Cerex" fabric; laminated to a 1000 denier XD ×1000 denier MD fiberglass scrim, 6×6 strands to the inch, SBR latex (styrene butadiene resin) adhesive applied to the scrim; laminated to a 1 oz/sq yd "Cerex" fabric.

Sample 8: 1 oz/sq yd "Cerex" fabric; laminated to a 500 denier XD ×1000 denier MD fiberglass scrim, 6×6 strands to the inch, "Rhoplex" water based acrylic resin adhesive applied to the scrim by spraying; laminated to a 1 oz/sq yd "Cerex" fabric; all layers laminated together in a hot press at 170° C. under 5 psi.

Sample 9: 1 oz/sq yd "Cerex" fabric; laminated to a 500 denier XD ×1000 denier MD fiberglass scrim, 6×6 strands to the inch, "Sharenet" resin adhesive mat placed between the first fabric and the scrim; laminated to a 1 oz/sq yd "Cerex" fabric; all layers laminated together in a hot press at 170° C. under 5 psi.

Sample 10: 1 oz/sq yd nylon "Sontara" fabric; laminated to a 500 denier XD ×1000 denier MD fiberglass scrim, 6×6 strands to the inch; laminated to a 1 oz/sq yd nylon "Sontara" fabric; all layers ultrasonically bonded in one step by melt fusion of the two fabrics to each other through the scrim.

TABLE 2

| | MOISTURE STABILITY (% CHANGES IN DIMENSION FROM AMBIENT) | | | | | |
|---|---|---|---|---|---|---|
| SAMPLE | DIR | 40° C./ 100RH wet | 40° C./ 10RH dry | 40° C./ 100RH wet | 40° C./ 10RH dry | TOT |
| 1 | XD | +10.4 | +4.7* | +10.1 | +8.4# | 10.4 |
| | MD | −0.7 | −3.8* | −2.1 | −6.9# | 6.9 |

TABLE 2-continued

MOISTURE STABILITY
(% CHANGES IN DIMENSION FROM AMBIENT)

| SAMPLE | DIR | 40° C./ 100RH wet | 40° C./ 10RH dry | 40° C./ 100RH wet | 40° C./ 10RH dry | TOT |
|---|---|---|---|---|---|---|
| 2 | XD | 0 | +0.3 | +0.3 | +0.3 | 0.3 |
|   | MD | +0.3 | —** | +0.1 | −0.6 | 0.9 |
| 3 | XD | +0.3 | −0.3 | +0.3 | −0.3 | 0.6 |
|   | MD | 0 | 0 | 0 | 0 | 0 |
| 4 | XD | 0 | 0 | 0 | 0 | 0 |
|   | MD | 0 | −0.3 | 0 | −0.6 | 0.6 |
| 5 | XD | 0 | 0 | 0 | −0.3 | 0.3 |
|   | MD | 0 | 0 | 0 | 0 | 0 |
| 6 | XD | +3.2 | −2.2 | +3.0 | −2.2 | 5.4 |
|   | MD | −2.0 | −7.2 | −1.9 | −6.9 | 7.2 |
| 7 | XD | +0.3 | −1.7 | +0.4 | −1.4 | 2.1 |
|   | MD | +0.3 | −4.0 | +0.3 | −3.7 | 4.3 |
| 8 | XD | 0 | −3.0 | +0.3 | −2.9 | 3.3 |
|   | MD | −0.3 | −0.9 | 0 | −1.2 | 1.2 |
| 9 | XD | 0 | −1.4 | 0 | −2.1 | 2.1 |
|   | MD | −0.2 | −0.8 | −0.3 | −0.8 | 0.8 |
| 10 | XD | 0 | 0 * | 0 | +0.3* | 0.3 |
|   | MD | 0 | −1.8* | 0 | −2.4* | 2.4 |

NOTE:
* 25° C./15RH
36° C./13RH
**Incorrect measurements taken; correct measurements not available.

These slight variations in the dry part of the cycle are considered insignificant for comparisons between the samples.

The stability criteria for the composite fabric of this invention is that the XD and MD dimensions should not change more than 1% under the conditions tested. A preferred form of the invention has dimensional changes no greater than 0.5% which can be successfully used as a backing for a tuftstring carpet as described above. A sample is considered to pass if the total dimensional change from maximum shrinkage to maximum expansion in any one direction is no greater than 1.0%. On this basis, samples 2, 3, 4, and 5 passed; samples 1, 6, 7, 8, 9, and 10 failed.

It was observed from the data for samples 3 and 5 that there was no shrinkage of the samples in the MD, even though in sample 1, the "Sontara" had a tendency to shrink a large amount in the MD, which was reflected in the other passing samples 2 and 4. It is believed that since samples 2 and 4 were made in a continuous process where some MD tension was applied to the "Sontara" and samples 3 and 5 were made in a batch process with no tension, this resulted in a higher shrinkage force in the pretensioned samples. Better results can be obtained if the tension in the nonwoven is low or near zero when it is joined with the scrim.

In sample 10, a lamination as in sample 3 was made, but the attachment was by ultrasonic bonding of the two mats to each other through the openings in the scrim instead of adhesive applied to the scrim. This resulted in many bonds between the filaments of the mats and produced a stiffer laminate. It behaved like the spunbonded laminate of samples 7, 8, and 9 that had the filaments in the nonwoven bonded to one another; the expansion of sample 10 was contained, but shrinkage in the MD was excessive at 2.4%.

We claim:

1. A composite fabric, comprising:

a) a first layer of a nonwoven fabric comprising entangled, non-bonded nylon filaments;

b) a second layer of fiberglass scrim comprising an array of intersecting continuous multifilament glass strands; and c) a third layer of a nonwoven fabric comprising entangled, non-bonded nylon filaments, wherein each layer of nonwoven fabric is adhesively attached to the layer of fiberglass scrim at a contact surface along said fabrics and scrim in such a manner that individual nylon filaments within the first and third layers of nonwoven fabric are mobile between the strands in the scrim.

2. The composite fabric of claim 1, wherein the fiberglass scrim comprises an intersecting array of at least 6 multifilament strands by 6 multifilament strands per inch of scrim.

3. The composite fabric of claim 2, wherein each multifilament strand has a denier of at least 500 and a tensile break strength of at least 8 pounds.

4. The composite fabric of claim 2, wherein the fiberglass scrim further comprises multifilament glass strands crossing over the intersecting array of multifilament strands in a diagonal direction.

5. The composite fabric of claim 1, wherein the nylon filaments of each nonwoven layer of nylon fabric are hydroentangled or needle-punched.

6. The composite fabric of claim 5, wherein the nylon filaments are continuous filaments or staple fiber.

7. The composite fabric of claim 1, wherein the adhesive is a modified acrylic resin.

* * * * *